METHOD FOR PREPARING POLYPEPTIDES

Newman M. Bortnick, Oreland, Pa., assignor to Rohm & Haas Company, Philadelphia, Pa., a corporation of Delaware No Drawing. Application June 3, 1954
Serial No. 434,318

8 Claims. (Cl. 260—77.5)

This invention relates to a method for preparing polypeptides. It further relates to a direct method for preparing polypeptides in high yields.

The known methods of preparing polypeptides involve cumbersome multi-step operations. Formerly, in order to form a polypeptide one started with an amino acid and performed operations on the amino radical to shield it from reaction while the acid group was being prepared for union with the amino group of another molecule. This necessitated several steps and in order to achieve the desired result many tedious and time-consuming procedures had to be followed.

It is an object of the present invention to provide a method for preparing polypeptides that is direct, effective, and readily consummated.

The present invention shows a method for directly preparing polypeptides from a compound of the formula

in which R is a tertiary alkyl group of four to eighteen, preferably four to ten, carbon atoms having a tertiary carbon atom attached directly to the urea nitrogen, and R' is hydrogen, an alkyl group of one to eleven carbon atoms, or an arylalkyl group of seven to eleven carbon atoms. These various R' members are equivalent for the purposes of this invention.

Among the typical R members that may be employed are tertiary butyl, tertiary hexyl, tertiary octyl, tertiary decyl, tertiary dodecyl, tertiary tetadecyl, and tertiary octadecyl groups. Among the typical

members that may be used are —CH₂—,

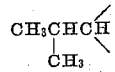

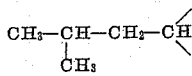

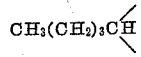

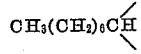

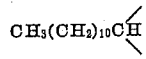

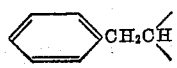

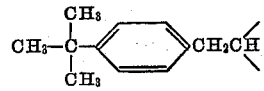

or the like.

The formation of the polypeptides according to the present invention is accomplished by heating the corresponding compound

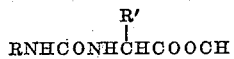

in which R is a tertiary alkyl group of four to eighteen carbon atoms having a tertiary carbon attached to the urea nitrogen and R' is hydrogen, an alkyl group of one to eleven carbon atoms, or an arylalkyl group of seven to eleven carbon atoms, at the reaction temperature which is in the temperature range of 175–300° C. at atmospheric or reduced pressures. Preferred conditions are 175–250° C. and pressures less than atmospheric down to 1 mm. In addition to the principal product of the reaction, the polypeptide, there are also formed RNHCONHR, $CO_2$, $RNH_2$, and

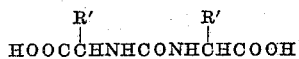

Apparently, two reactions simultaneously occur

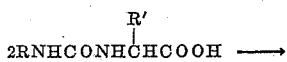

and

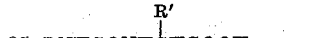

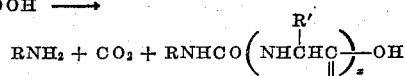

in which $x$ is an integer apparently from 2 to 100. The former reaction predominates when rapid heating and temperatures in the very high part of the reaction range are employed. The latter reaction is strongly favored when slow heating and temperatures of no higher than 250° C. are used. Therefore, in order to produce maximum yields of the polypeptide slow heating and restriction of the temperature in the range of 175 to 250° C. are preferred. Under these conditions yields up to 80% of the polypeptide have been obtained.

The products of the reaction are easily separated so that a pure polypeptide is readily obtained. As the reaction progresses carbon dioxide is evolved and passes out of the reaction medium. The compounds RNHCONHR and $RNH_2$ distill at the reaction temperatures and are collected as a distillate. Although the compounds conforming to the formula RNHCONHR are usually viscous liquids or crystalline solids, they are in equilibrium at the reaction temperature with the corresponding amine and isocyanate according to the equation $$RNHCONHR \rightleftharpoons RNH_2 + RNCO$$

The amines and isocyanates readily distill and after being condensed together reform the urea compound. Only the compounds corresponding to the formula

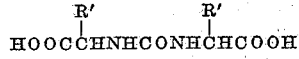

remain in the residue with the polypeptides and by maintaining the preferred reaction conditions this side reaction is kept at a minimum.

The present reaction progresses satisfactorily without the aid of catalysts or other additional agents. The polypeptide products whose characteristics are generally controlled by the nature of the $$-(-NHCHC-)-\overset{R'}{\underset{O}{|}}$$

grouping are very viscous liquids and hard solids that are valuable as adhesives, coating compositions and fibers.

The starting compounds of the present invention, $$RNHCONHCHCOOH\overset{R'}{\underset{}{|}}$$

are readily formed by the known reaction of an amine and an isocyanate. In the present invention the amine group is supplied by an alpha amino acid. The following preparations illustrate a satisfactory method for making the compounds $$RNHCONHCHCOOH\overset{R'}{\underset{}{|}}$$

in which parts by weight are used throughout.

PREPARATION A

There was added to a mixture of 37.5 parts of glycine, 20 parts of sodium hydroxide, and 400 parts of water, 77.8 parts of tertiary octyl isocyanate. The entire mixture was stirred and an exothermic reaction resulted causing the temperature to rise to 50° C. At the conclusion of the reaction the solution was acidified with acetic acid and the product separated by filtration. The product was identified as tert-$C_8H_{17}$NHCONHCH$_2$COOH In an analogous manner, from alanine and tertiary octadecyl isocyanate there was produced the substituted urea corresponding to the formula tert-$C_{18}H_{37}$NHCONHCHCOOH
$\qquad\qquad\qquad\qquad |$
$\qquad\qquad\qquad\quad CH_3$

PREPARATION B

A mixture of 58.5 parts of valine, 20 parts of sodium hydroxide, 350 parts of water, and 119.5 parts of tert-tetradecyl isocyanate was stirred. A reaction occurred causing the temperature of the mixture to rise. Stirring was continued until the heat of reaction dissipated and the mixture started to cool. The solution was then acidified with acetic acid. The product was separated and identified as tert-$C_{14}H_{29}$NHCONHCHCOOH
$\qquad\qquad\qquad\quad |$
$\qquad\qquad\qquad\; CH$
$\qquad\qquad\quad CH_3\;\;\;CH_3$ Similarly there was prepared tert-$C_{12}H_{25}$NHCONHCHCOOH
$\qquad\qquad\qquad\quad |$
$\qquad\qquad\qquad\; CH_2$
$\qquad\qquad\qquad\; CH-CH_3$
$\qquad\qquad\qquad\; CH_3$ from tertiary decyl isocyanate and leucine.

PREPARATION C

To a mixture of 65.5 parts of $$CH_3(CH_2)_3CHCOOH\overset{NH_2}{\underset{}{|}}$$

20 parts of sodium hydroxide and 400 parts of water, there was added 77.8 parts of tertiary octyl isocyanate. The whole mixture was stirred and an exothermic reaction was observed. Stirring was continued until the reaction was complete. As the heat of reaction abated, the solution was acidified with acetic acid and the product separated.

The product was identified as tert-$C_8H_{17}$NHCONHCHCOOH
$\qquad\qquad\qquad |$
$\qquad\qquad\quad (CH_2)_3$
$\qquad\qquad\qquad |$
$\qquad\qquad\quad CH_3$ Similarly, there was prepared the compounds tert-$C_{10}H_{21}$NHCONHCHCOOH
$\qquad\qquad\qquad |$
$\qquad\qquad\quad (CH_2)_6$
$\qquad\qquad\qquad |$
$\qquad\qquad\quad CH_3$ and tert-$C_{12}H_{25}$NHCONHCHCOOH
$\qquad\qquad\qquad |$
$\qquad\qquad\quad (CH_2)_{10}$
$\qquad\qquad\qquad |$
$\qquad\qquad\quad CH_3$ from the corresponding amino acids and isocyanates.

PREPARATION D

A mixture of 82.5 parts of phenylalanine, 20 parts of sodium hydroxide, 425 parts of water and 77.8 parts of tertiary octyl isocyanate was stirred continuously during the time the reaction occurred and until the heat evolved from the reaction started to diminish. The solution was then acidified with acetic acid and the product separated. The product corresponded to

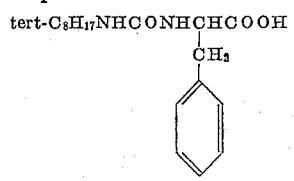

In an analogous manner, there was prepared tert-$C_8H_{17}$NHCONHCHCOOH$\quad$CH$_3$
$\qquad\qquad\qquad\quad |\qquad\qquad\qquad |$
$\qquad\qquad\quad CH_2CH-CH_2C-CH_3$
$\qquad\qquad\qquad\quad |\qquad\qquad\qquad |$
$\qquad\qquad\quad\;\; CH_3\qquad\quad CH_3$ from the corresponding amino acid and isocyanate.

The polypeptides are prepared, according to the present invention, from compounds of the general formula $$RNHCONHCHCOOH\overset{R}{\underset{}{|}}$$

previously defined, as is shown in the following illustrative examples.

Example 1

There was charged to a reaction vessel equipped with a condenser and sidearm receiver a portion of tert-$C_8H_{17}$NHCONHCH$_2$COOH Heat was applied to the system gradually and slowly. At 175–180° C. a reaction was observed and distillation occurred. The distillate was collected in the receiver and carbon dioxide which was evolved passed from the system. The temperature was gradually increased to 250° C. at which point the reaction was complete. Crystal formation was observed in the distillate. The distillate contained tert-$C_8H_{17}$NHCONHC$_8H_{17}$-tert and tert-$C_8H_{17}$NH$_2$ The residue corresponded to primarily tert-$C_8H_{17}$NHCO$-(-$NHCH$_2$C$-)_x-$OH
$\qquad\qquad\qquad\qquad\qquad\quad ||$
$\qquad\qquad\qquad\qquad\qquad\quad O$ with a small amount of HOOCCH$_2$NHCONHCH$_2$COOH. Similarly, the polypeptide tert-$C_{18}H_{37}$NHCO$-(-$NHCHC$-)_x-$OH
$\qquad\qquad\qquad\qquad\qquad |\;\;\;||$
$\qquad\qquad\qquad\qquad\qquad |\;\;\;O$
$\qquad\qquad\qquad\qquad\quad CH_3$ was produced from

Example 2

A sample of

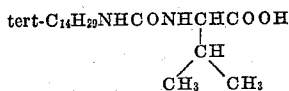

was introduced into a reaction vessel having a column and sidearm receiver. The pressure of the system was reduced and heat was slowly applied until when the temperature reached 180° C. a reaction was observed. Carbon dioxide was evolved and a distillate was collected in the receiver. The temperature was gradually increased until it reached 260° C. At the conclusion of the reaction the distillate was separated into its two individual compounds which were identified as

and

The residue contained two products which were identified as the polypeptide,

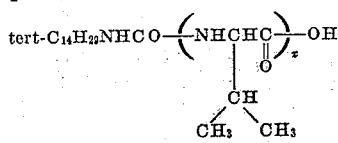

and

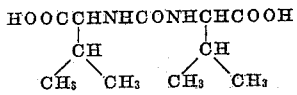

In the same manner, the polypeptide,

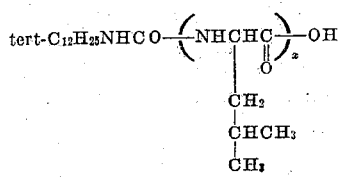

was prepared from

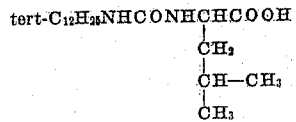

Example 3

A portion of

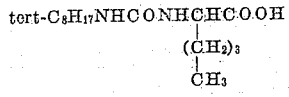

was charged to a reaction vessel equipped with a distillation column and a sidearm receiver. The temperature of the system was gradually raised until at about 175° C. a reaction occurred. As the reaction progressed, a distillate was collected and carbon dioxide was evolved from the system. The temperature was slowly raised as the reaction proceeded until at 275° C. the reaction was complete. Crystallization occurred in the distillate and these crystals were identified as

Also present in the distillate was

The products in the residue were identified as primarily the polypeptide,

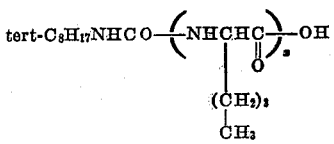

with some

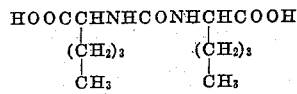

In an analogous manner, the polypeptides,

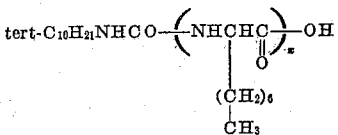

and

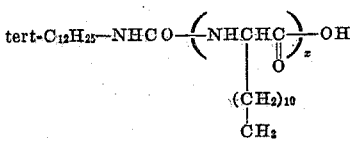

were prepared from

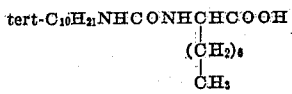

and

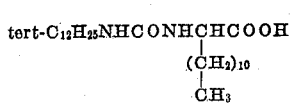

respectively.

Example 4

There was added to a reaction vessel, having a condenser and receiver, a sample of

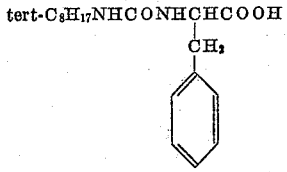

to the system and the temperature gradually increased. At 175–180° C. a reaction started and a distillation was observed and carbon dioxide was evolved. As the reaction continued the temperature was gradually increased until it reached 255–260° C. at which point the reaction was complete. A crystalline product slowly formed in the distillate. The distillate was examined and found to contain two products which were identified as

The residue contained two products which were identified as the polypeptide,

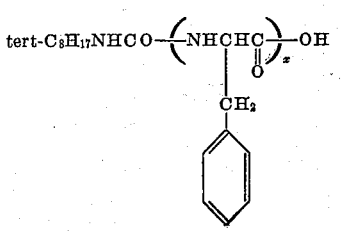

which was present in the preponderate amount, and

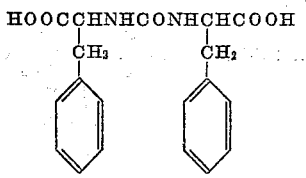

In a like manner, there was prepared the polypeptide,

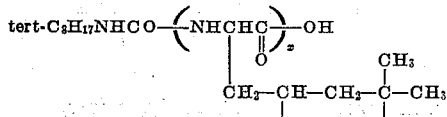

from

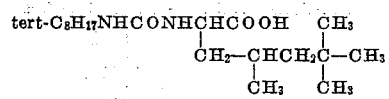

I claim:
1. A method for preparing polypeptides of the formula

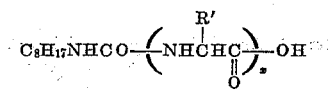

from compounds of the formula

in which said $C_8H_{17}$ has a tertiary carbon atom attached to the urea nitrogen, R' is a member of the class consisting of hydrogen, an alkyl group of one to eleven carbon atoms, and an arylalkyl group of seven to eleven carbon atoms, and $x$ is an integer of 2 to 100, which comprises heating at a reacting temperature said

in the range of 175 to 250° C. at pressures less than atmospheric down to 1 mm. until distillation ceases and obtaining said polypeptides in the residue.

2. A method for preparing the polypeptides

from the compound $$C_8H_{17}NHCONHCH_2COOH$$

in which said $C_8H_{17}$ group has a tertiary carbon atom attached to the urea nitrogen and $x$ is an integer of two to 100, which comprises heating at a reacting temperature said $C_8H_{17}NHCONHCH_2COOH$ in the range of 175 to 250° C. at pressures less than atmospheric down to 1 mm. until distillation ceases and obtaining said polypeptides in the residue.

3. A method for preparing the polypeptides

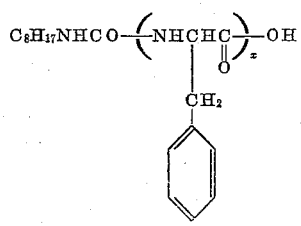

from the compound

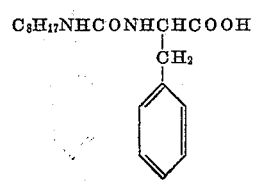

in which said $C_8H_{17}$ group has a tertiary carbon atom attached to the urea nitrogen, and $x$ is an integer of 2 to 100, which comprises heating at a reacting temperature said

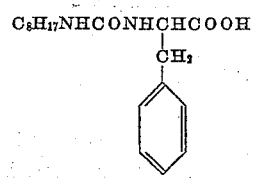

in the range of 175 to 250° C. at pressures less than atmospheric down to 1 mm. until distillation ceases and obtaining said polypeptides in the residue.

4. A method for preparing the polypeptides

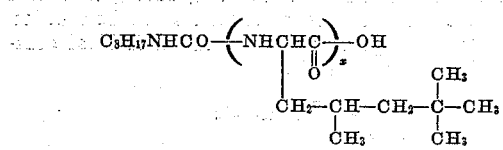

from the compound

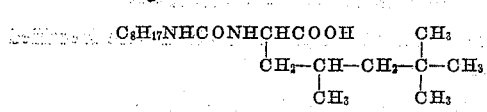

in which said $C_8H_{17}$ group has a tertiary carbon atom attached to the urea nitrogen, and $x$ is an integer of 2 to 100, which comprises heating at a reacting temperature said

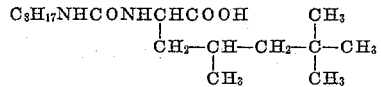

in the range of 175 to 250° C. at pressures less than atmospheric down to 1 mm. until distillation ceases and obtaining said polypeptides in the residue.

5. A method for preparing polypeptides which comprises heating at a reacting temperature in the range of 175 to 250° C. at pressures less than atmospheric down to 1 mm. until distillation ceases compounds having the formula

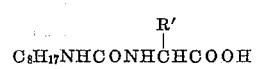

in which said $C_8H_{17}$ has a tertiary carbon atom attached to the urea nitrogen and R' is a member of the class consisting of hydrogen, an alkyl group of one to eleven carbon atoms, and an arylalkyl group of seven to eleven carbon atoms.

6. A method for preparing a polypeptide which comprises heating at a reacting temperature in the range of 175 to 250° C. at pressures less than atmospheric down to 1 mm. until distillation ceases the compound $$C_8H_{17}NHCONHCH_2COOH$$

in which said $C_8H_{17}$ has a tertiary carbon atom attached to the urea nitrogen.

7. A method for preparing a polypeptide which comprises heating at a reacting temperature in the range of 175 to 250° C. at pressures less than atmospheric down to 1 mm. until distillation ceases the compound

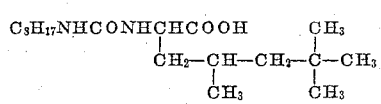

in which said $C_8H_{17}$ has a tertiary carbon atom attached to the urea nitrogen 8. A method for preparing a polypeptide which comprises heating at a reacting temperature in the range of 175 to 250° C. at pressures less than atmospheric down to 1 mm. until distillation ceases the compound

C₈H₁₇NHCONHCHCOOH
          |
          CH₂—C₆H₅ in which said $C_8H_{17}$ has a tertiary carbon atom attached to the urea nitrogen.

References Cited in the file of this patent

UNITED STATES PATENTS

| | | |
|---|---|---|
| 2,143,490 | Meyer | Jan. 10, 1939 |
| 2,572,568 | Gluesenkamp | Oct. 23, 1951 |